J. A. MERONEY.
EVAPORATOR.
APPLICATION FILED MAR. 21, 1917.

1,283,254.

Patented Oct. 29, 1918.
3 SHEETS—SHEET 1.

WITNESSES:
F. C. Fliedner
J. H. Herring

INVENTOR
John A. Meroney
BY Strong & Townsend
ATTORNEYS

J. A. MERONEY.
EVAPORATOR.
APPLICATION FILED MAR. 21, 1917.

1,283,254. Patented Oct. 29, 1918.
3 SHEETS—SHEET 2.

WITNESSES:
F. C. Fliedner
J. H. Herring

INVENTOR
John A. Meroney,
BY Strong & Townsend
ATTORNEYS

J. A. MERONEY.
EVAPORATOR.
APPLICATION FILED MAR. 21, 1917.

1,283,254.

Patented Oct. 29, 1918
3 SHEETS—SHEET 3.

WITNESSES:
H. C. Gliedne
J. H. Herring

INVENTOR
John A. Meroney,
by Strong & Townsend
ATTORNEYS

UNITED STATES PATENT OFFICE.

JOHN A. MERONEY, OF SAN FRANCISCO, CALIFORNIA, ASSIGNOR TO NUPRO EVAPORATOR CO., OF SAN FRANCISCO, CALIFORNIA, A CORPORATION OF CALIFORNIA.

EVAPORATOR.

1,283,254.   Specification of Letters Patent.   Patented Oct. 29, 1918.

Application filed March 21, 1917. Serial No. 156,239.

*To all whom it may concern:*

Be it known that I, JOHN A. MERONEY, a citizen of the United States, residing in the city and county of San Francisco and State of California, have invented new and useful Improvements in Evaporators, of which the following is a specification.

This invention relates to the drying and evaporation of fruits and the like; and has for its object to provide a simplified and improved drier and evaporator for this purpose.

Generally stated, the invention comprises a furnace with an oven to receive fruit and means for circulating the air heated by the furnace through the oven to dry and evaporate the fruit. Means are also employed for filtering the air and changing it.

One form which my invention may assume is exemplified in the following description and illustrated in the accompanying drawings, in which—

Figure 2:
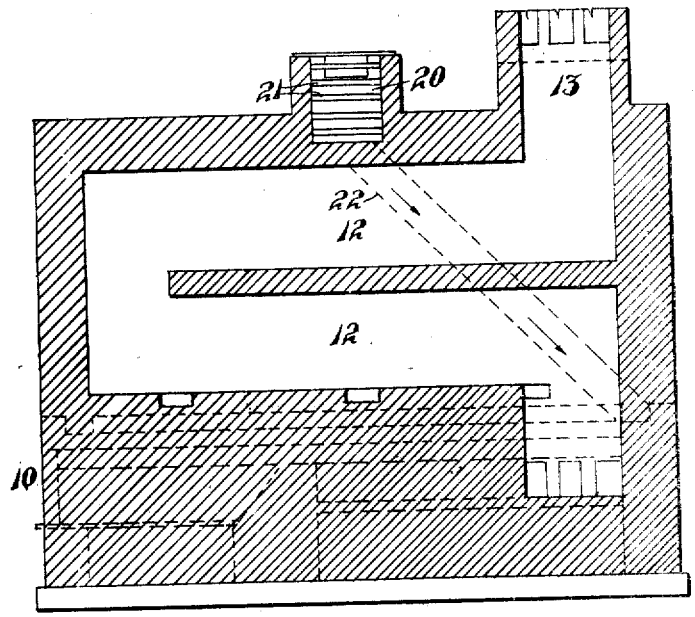
Fig. 2 shows a sectional view of the same, taken on line 2—2 of Fig. 1.
Figure 1:
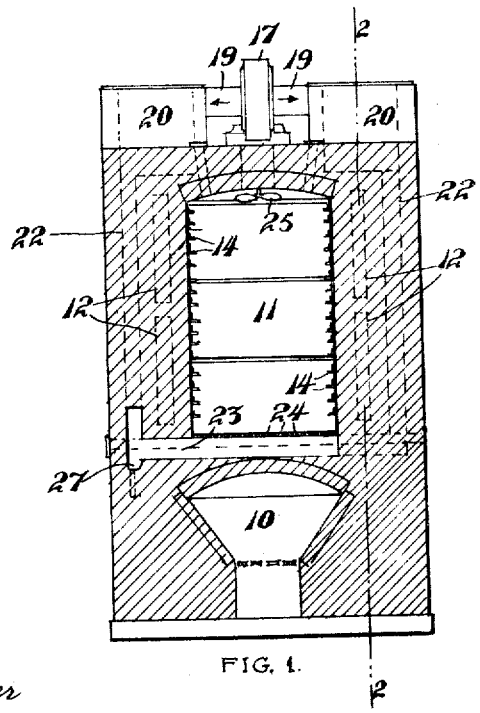
Figure 1 shows a vertical, longitudinal, sectional view of a device embodying my invention.
Figure 4:
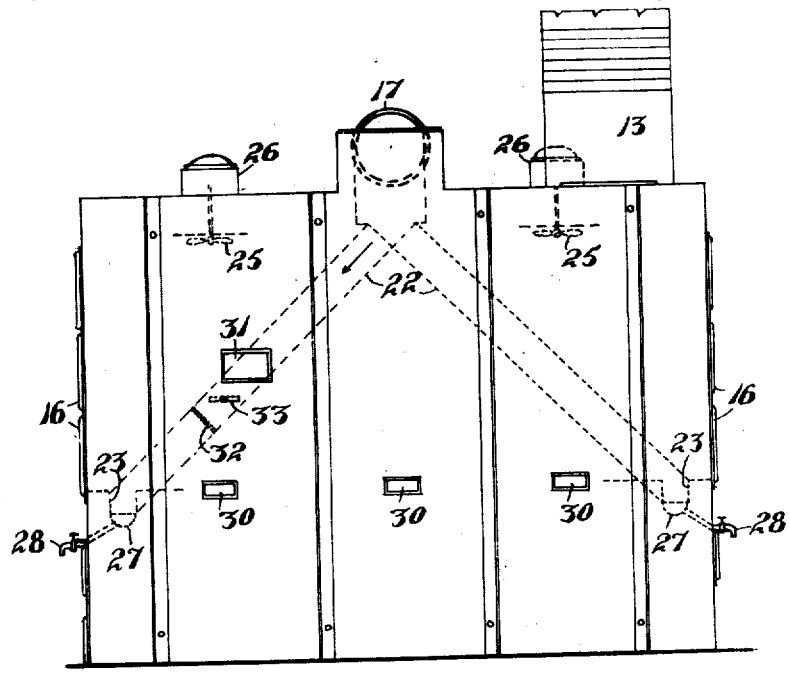
Fig. 4 shows a side elevation of the complete device.
Figure 3:
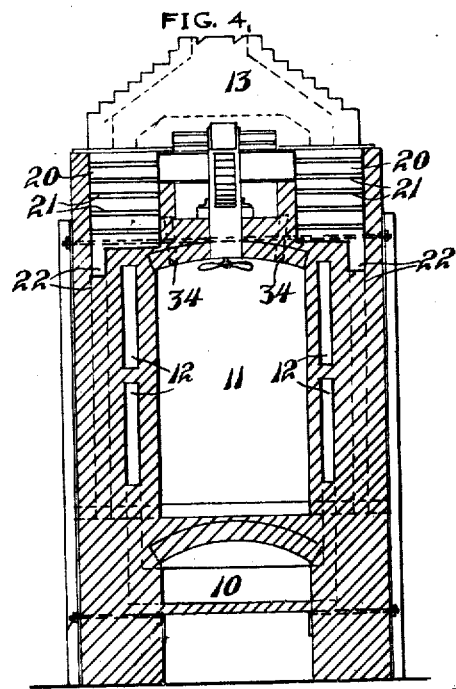
Fig. 3 shows a view, similar to Fig. 1, looking in the opposite direction.
Figure 6:
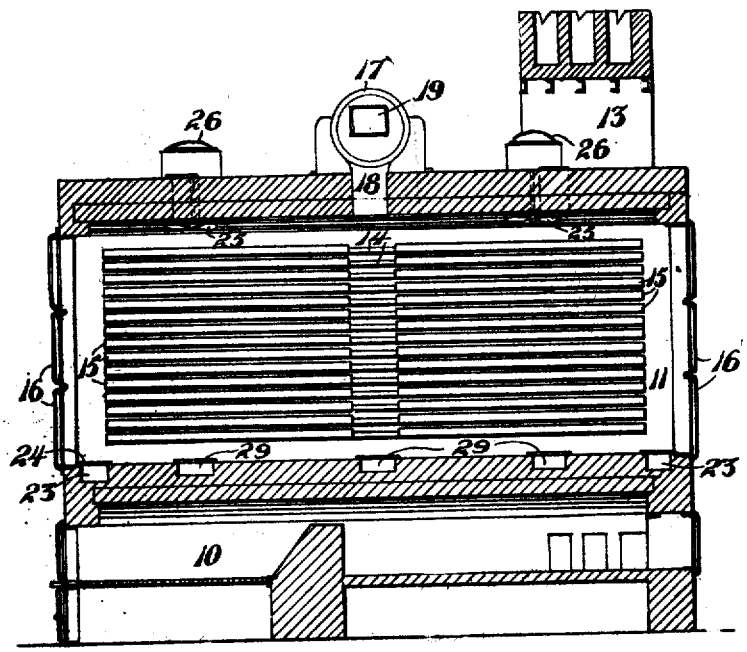
Fig. 6 shows a vertical, central, longitudinal, sectional view of the same.
Figure 5:
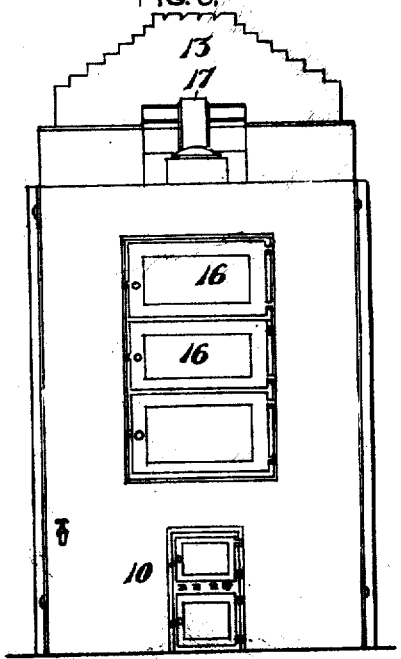
Fig. 5 shows an end elevation of the same.

In the drawings a furnace is indicated at 10, over which is an oven 11, in the side walls of which flues 12 lead back and forth to a smoke stack 13. The oven is fitted with racks 14 to receive trays 15 containing the fruit to be dried and has doors 16 at each end for the introduction of the trays. At the top of the oven is a blower 17 with its intake 18 positioned within the oven centrally thereof and outlets 19 extending to either side into filtering compartments 20, the latter containing trays 21 filled with charcoal or the like for filtering and purifying the air. From the central portion of each compartment 20 an air duct 22 extends obliquely to one end of the structure and opens into the oven through a conduit 23 in the form of a pipe extending transversely along the bottom of the oven and one end thereof and having perforations 24 establishing communication with the oven. There is one such conduit at each end of the oven communicating with a filtering chamber on one side of the oven only.

The air heated by the furnace is circulated through the filtering chambers and into the oven at each end, being drawn upwardly therethrough to the center by the blower 17 and back again continuously. To assist in the distribution of the hot air in the furnace fans 25 are employed, one near each end of the oven and operated by a motor 26, whereby the hot air is driven downwardly from the top of the oven and kept in circulation. The moisture in the hot air collects in a drain 27 beneath each of the conduits 23 and is drawn off by a cock 28.

Preferably the bottom of the oven is formed with transversely extending portions 29 to receive trays of sulfur inserted through doors 30 in the side walls of the furnace. Thereby the sulfuring of the fruit may be carried on in connection with the drying and evaporating thereof. Access to the air ducts 22 is provided for by a door 31, adjacent to which a screen 32 may be placed to collect any dust or dirt present in the air. Beneath each door a damper 33 is preferably arranged which, when closed, allows the warm air to be driven out for changing the air. Fresh air is then introduced through the doors 30 or may be admitted through the covered vents 34 in the top of the oven.

In operation, the fruit is introduced in the oven in trays which are piled, as shown, so that the air circulation is not interfered with. The blower is put in operation and the air which has been heated by the furnace is circulated continuously through the oven until the fruit is dried. The moisture in the air is collected in the drains 27 and the air when stale may be expelled through the doors 31 by closing the dampers 33. The fans 25 assist in moving the warm air to the bottom of the oven and prevent its becoming stagnant in the ends and corners of the oven. The passage of the warm air through the filtering chambers insures that it will be clean and pure when introduced into the oven.

Various changes in the construction and arrangement of the several parts herein shown and described may be employed without departing from the spirit of my invention as disclosed in the appended claims.

Having thus described my invention, what

I claim and desire to secure by Letters Patent is—

1. In a device for drying and evaporating fruits and the like, a furnace, an oven overlying the same, a series of superimposed trays in the oven to receive the material to be dried and evaporated, and means for introducing air at the bottom of the oven and withdrawing it therefrom at the top, whereby to carry off the moisture-laden and stale air and substitute a dry clean air.

2. In a device for drying and evaporating fruits and the like, a furnace, an oven overlying the same, a series of superimposed trays in the oven to receive the material to be dried and evaporated, means for passing a current of air continuously through said oven in a vertical direction and returning it around the outside of the oven, and means for purifying and drying the returned air.

3. In a fruit drier and evaporator, a furnace, an oven overlying the same and having flues formed in its walls for the escape of the products of combustion from the furnace, and means for passing heated air at the bottom thereof, withdrawing it at the top and returning it through the walls adjacent to the flues.

4. In a fruit drier and evaporator, a furnace, an oven overlying the same and having flues formed in its walls for the escape of the products of combustion from the furnace, a blower at the top of the oven for drawing air therethrough, and passageways in the walls of the oven adjacent to the flues through which the air is returned to the bottom of the oven by the blower.

5. In a drying oven, a blower at the top thereof having its intake communicating with the interior of the oven, air passageways in the side walls of the oven communicating with the blower and with the bottom of the oven, and means in said air passageways for by-passing the heated air therefrom when it is desired to introduce fresh air to the oven.

6. In a drying oven, a blower at the top thereof having its intake communicating with the interior of the oven, air passageways in the side walls of the oven communicating with the blower and with the bottom of the oven, and drains at the bottom of the air passageways for collecting the moisture from the heated air.

7. In a drying oven, a blower at the top thereof having its intake communicating with the interior of the oven, air passageways in the side walls of the oven communicating with the blower and with the bottom of the oven, conduits extending transversely through the bottom of the oven in communication with the air passageways and having their walls perforated to open into the oven.

8. In a drying oven, a blower at the top thereof having its intake communicating with the interior of the oven, and air passageways in the side walls of the oven communicating with the blower and with the bottom of the oven, said air passages extending diagonally, one on either side of the oven, to open into the end thereof.

9. In a drying oven, a blower at the top thereof having its intake communicating with the interior of the oven, air passageways in the side walls of the oven communicating with the blower and with the bottom of the oven, and a fan at either end of the oven at the top thereof for driving the warm air downwardly to keep it in circulation.

10. In a fruit drier and evaporator, a furnace, an oven overlying the same and having horizontally extending flues formed in its walls for carrying off the products of combustion, said flues being so arranged as to pass said products back and forth a plurality of times, and means for circulating hot air through the oven and returning it thereto through the walls adjacent to said flues.

11. A drying apparatus comprising a heater, a superposed oven heated thereby, a plurality of independent superposed drying trays, means to introduce the sets of trays from opposite ends of the oven and form an open space between their adjacent ends, air impelling means by which air is drawn upwardly through said open space, and discharge passages leading from the impelling device to return the air to opposite sides of the oven bottom.

12. A drying apparatus comprising a heater, a superposed oven heated thereby, a plurality of independent superposed drying trays, means to introduce the sets of trays from opposite ends of the oven and form an open space between their adjacent ends, air impelling means by which air is drawn upwardly through said open space, discharge passages leading from the impelling device to return the air to opposite sides of the oven bottom, and filtering means through which air from the impelling device is delivered.

13. A drying apparatus comprising a heater, a superposed oven compartment, independent superposed series of trays located in said compartment with an open passage between the adjacent ends of the trays, an impelling device and passages connecting therewith, filtering means in said passages through which the air may return to the oven, and fan blowers located above each series of trays to force a portion of the air downward through the trays and their contents.

14. A drying apparatus including a structure having a heater, a superposed oven and independent separated series of drying trays contained in said oven, a suction apparatus located centrally at the top, connected filter chambers, passages connecting said chambers with the bottom of the oven to return and re-heat the air, means to force the reheated air downwardly through the trays, and means to conduct away the condensed moisture.

15. A drying apparatus including a heater, a superposed tray containing oven compartment, an air impelling device located within and at the top of said compartment, chambers into which air is discharged therefrom, and passages through which air from said chambers is returned to the oven bottom to be reheated, said passages having openings from the exterior with valves through which the air may be discharged and removed.

16. A drying apparatus comprising a heater, a superposed drying chamber with stacks of trays at either end, having an open vertical passage therebetween, a suction device connected with the upper end of said passage, filter chambers into which said suction device discharges, passages by which the air may be returned to the bottom of the drying chamber for reheating, and vertically journaled fans by which the heated air may be forced downward through the drying trays.

In testimony whereof I have hereunto set my hand in the presence of two subscribing witnesses.

JOHN A. MERONEY.

Witnesses:
HENRY SIMON,
ALFRED D. MARTIN.